(12) United States Patent
Nagata (10) Patent No.: US 8,850,671 B2
(45) Date of Patent: Oct. 7, 2014

(54) CLIP AND ATTACHING STRUCTURE

(75) Inventor: Tomoaki Nagata, Nagoya (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 229 days.

(21) Appl. No.: 12/690,321

(22) Filed: Jan. 20, 2010

(65) Prior Publication Data
US 2010/0186201 A1 Jul. 29, 2010

(30) Foreign Application Priority Data

Jan. 27, 2009 (JP) ................................. 2009-015412

(51) Int. Cl.
| | | |
|---|---|---|
| F16B 2/20 | (2006.01) | |
| B60N 2/58 | (2006.01) | |
| F16B 2/24 | (2006.01) | |
| B60N 2/60 | (2006.01) | |
| B60N 2/16 | (2006.01) | |

(52) U.S. Cl.
CPC ............ *B60N 2/6009* (2013.01); *B60N 2/5825* (2013.01); *F16B 2/243* (2013.01); *B60N 2/16* (2013.01)
USPC ..................... 24/458; 24/294; 24/295; 24/546

(58) Field of Classification Search
CPC ... B60N 2/5825; B60R 13/0206; F16B 2/243; F16B 5/06
USPC ........... 24/457, 458, 585, 286, 546, 547, 554, 24/556, 561, 289, 292, 293, 295, 294, 24/297; 296/1.08
See application file for complete search history.

(56) References Cited

U.S. PATENT DOCUMENTS

| | | | | |
|---|---|---|---|---|
| 2,059,049 A | * | 10/1936 | Smith | 24/581.11 |
| 2,100,017 A | * | 11/1937 | Van Uum | 24/294 |
| 2,152,601 A | * | 3/1939 | Murphy | 24/458 |
| 2,177,591 A | * | 10/1939 | Churchill | 24/458 |
| 2,655,072 A | * | 10/1953 | Poupitch | 411/548 |
| 2,807,068 A | * | 9/1957 | Wootton | 24/294 |
| 2,909,819 A | * | 10/1959 | Fernberg | 411/477 |
| 4,710,852 A | * | 12/1987 | Keen | 361/717 |
| 5,141,282 A | | 8/1992 | Fujiwara | |
| 5,956,821 A | * | 9/1999 | Kurek et al. | 24/458 |
| 6,883,679 B2 | * | 4/2005 | Underwood | 220/802 |

FOREIGN PATENT DOCUMENTS

| | | |
|---|---|---|
| JP | 63-106908 | 7/1988 |
| JP | 4-41439 | 4/1992 |
| JP | 2001-328497 | 11/2001 |
| JP | 2003-80986 | 3/2003 |

* cited by examiner

*Primary Examiner* — Robert J Sandy
*Assistant Examiner* — Michael Lee
(74) *Attorney, Agent, or Firm* — Greenblum & Bernstein, P.L.C.

(57) ABSTRACT

A clip includes first and second clamping pieces provided to clamp a member to be fixed. The first clamping piece includes an insertion part to be inserted into a thorough hole of a fixed member. The insertion part includes a pair of strip member, each including a smaller width portion, a larger width portion and a stepped portion provided therebetween. In a course of the insertion part being inserted into the through hole, the larger width portions of the strip members pass the through hole while the strip members are flexed in the direction approaching to each other, and subsequently when the smaller width portions are inserted into the through hole, the strip members are allowed to be deformed in a direction separating from each other to return to an original state, whereby the stepped portions are locked to a region to be locked in the fixed member.

2 Claims, 7 Drawing Sheets

CLIP AND ATTACHING STRUCTURE

BACKGROUND OF THE INVENTION

1. Field of the Invention

The present invention relates to a clip configured to be attached to a member to be fixed and fix the member to be fixed to a fixed member, and an attaching structure of a member to be fixed and a fixed member with a clip.

2. Description of the Related Art

JP-A-2003-80986 describes a structure for attaching two members to each other. Specifically, this application publication describes an attaching structure for a plurality of finishers which are provided so as to surround a bottom of a seat cushion of a seat which is equipped in an automobile. In this attaching structure of the finishers, one of the finishers to be attached includes a leg portion projected in the end part thereof, and an arrowhead portion formed at a tip end of the leg portion. The other one of the finishers to be attached includes an opening provided in an end part thereof so that the leg portion of the one finisher can be inserted into the opening, a pair of pressing portions which urge the leg portion to be clamped therebetween around the opening, and a pair of stopping portions which protrude perpendicularly to the pressing portions and prevent a release of the arrowhead portion. In order to attach these finishers to each other, the leg portion of the one finisher is inserted into the opening against the urging force of the pressing portions of the other finisher, and pushed in, until the arrowhead portion overrides the stopping portions. Accordingly, the stopping portions resist a load in a releasing direction of the arrowhead portion of the leg portion, so that the two finishers are attached to each other. According to the above-described attaching structure of the finishers, it is possible to reliably attach (fix) the finishers to each other, by simple operation of inserting the leg portion of the one finisher into the opening of the other finisher.

However, according to the above-described structure, it is necessary to provide projections having specific shapes on both of the two members to be attached, so that the shapes of the two members to be attached are complicated.

SUMMARY OF THE INVENTION

It is an aspect of the present invention to provide a clip which allows a member to be easily and reliably fixed to a fixed member with simple structures, and an attaching structure of a member to a fixed member with a clip.

According to an exemplary embodiment of the present invention, there is provided a clip configured to be attached to a member to be fixed and fix the member to be fixed to a fixed member. The clip comprises: first and second clamping pieces provided so as to clamp both faces of a flat plate region of the member to be fixed, the first and second clamping pieces being integrally connected to have a U-shape. The first clamping piece includes: an insertion part which has an omega ($\Omega$) shape protruding in a direction separating from the second clamping piece and which is configured to be inserted into a through hole formed in the fixed member to be engaged therewith, wherein the insertion part includes a pair of strip members which are separately provided in an opposing state and connected at tip ends thereof in an inserting direction so as to be flexed in a direction approaching to each other; and first and second rib parts provided to extend from base ends of the strip members, respectively, and protrude outward of the through hole formed in the fixed member to oppose a surface of the fixed member so as not to be insertable into the through hole when the insertion part is inserted in the through hole. Each of the strip members includes: a smaller width portion having a width by being cut out at both sides thereof at the base end thereof; a larger width portion having a larger width than the smaller width portion and provided at a tip end side from the smaller width portion; and a stepped portion provided between the smaller width portion and larger width portion. In a course of the insertion part of the first clamping piece being inserted into the through hole of the fixed member, the larger width portions of the strip members pass the through hole while the strip members are flexed in the direction approaching to each other, and subsequently when the smaller width portions are inserted into the through hole, the strip members are allowed to be deformed in a direction separating from each other to return to an original state, whereby the stepped portions are locked to a region to be locked in the fixed member, so that the insertion part becomes into a retained state with respect to the through hole and fixed to the fixed member.

According to another exemplary embodiment of the present invention, there is provided an attaching structure comprising: a first member having a flat plate region; a second member having a through hole; and a clip which is attached to the first member and the second member to fix the first member with respect to the second member. The clip includes: a first clamping piece opposing a first face of the flat plate region of the first member; a second clamping piece opposing a second face of the flat plate region of the first member, the second face being opposite to the first face; and a connecting portion connecting the first and second clamping pieces. The first clamping piece includes: a first rib part which is connected to the connecting portion and provided substantially parallel to the second clamping piece; an insertion part which protrudes in a direction separating from the second clamping piece and which includes a first strip member connected to the first rib part, and a second strip member connected to the first strip member at a protruding end; and a second rib part which is connected to the second strip member. Each of the first and second strip members includes a smaller width portion, and a larger width portion provided at a protruding end side from the smaller width portion, the larger width portion being wider than the smaller width portion. The insertion part is inserted into the through hole of the second member while the smaller width portion contacting the through hole.

According to a further exemplary embodiment of the present invention, there is provided a clip configured to be attached to a first member and a second member to fix the first member with respect to the second member. The clip comprises: a first clamping piece provided to oppose a first face of a flat plate region of the first member; a second clamping piece provided to oppose a second face of the flat plate region of the first member, the second face being opposite to the first face; and a connecting portion connecting the first and second clamping pieces. The first clamping piece includes: a first rib part which is connected to the connecting portion and provided substantially parallel to the second clamping piece; an insertion part which protrudes in a direction separating from the second clamping piece and which includes a first strip member connected to the first rib part, and a second strip member connected to the first strip member at a protruding end; and a second rib part which is connected to the second strip member. Each of the first and second strip members includes a smaller width portion, and a larger width portion provided at a protruding end side from the smaller width portion, the larger width portion being wider than the smaller width portion. The insertion part is configured to be inserted into a through hole of the second member while the smaller width portion contacting the through hole.

DETAILED DESCRIPTION

Figure 1:
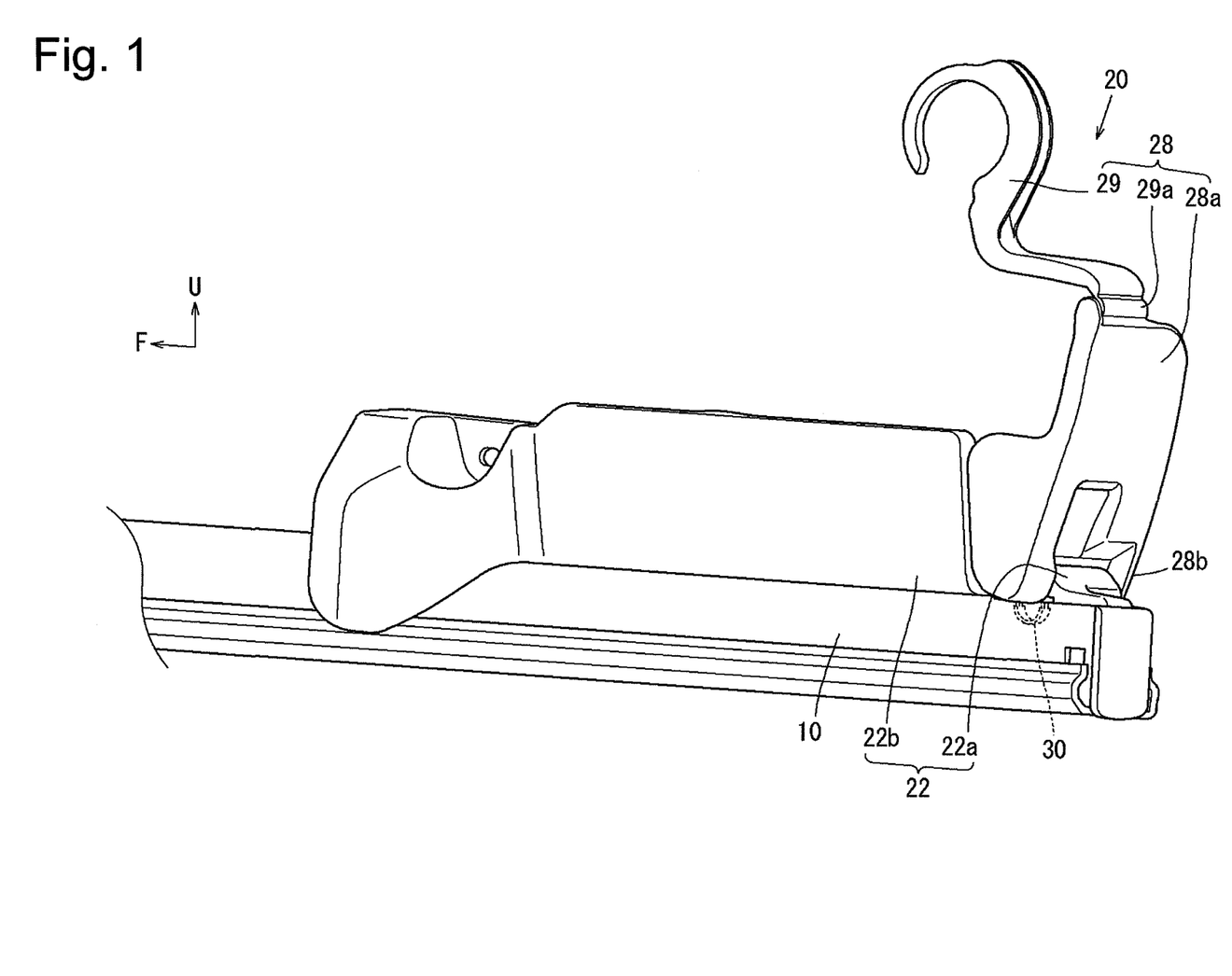
FIG. 1 is a perspective view showing a cover member in a state attached to an upper rail according an exemplary embodiment of the present invention.
Figure 2:
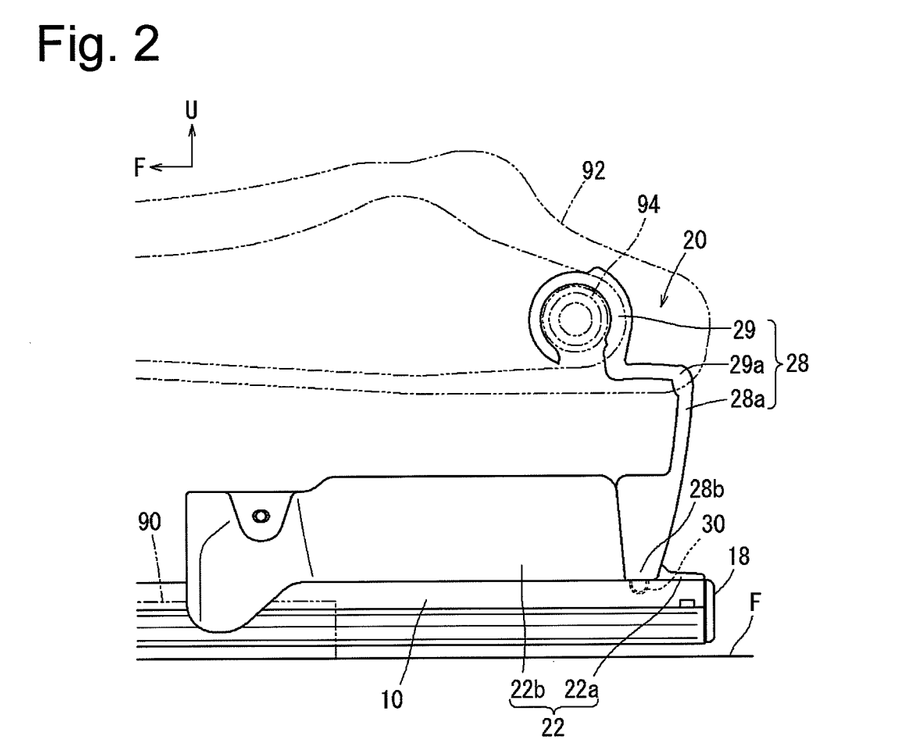
FIG. 2 is a side view showing the cover member in the state attached to the upper rail according an exemplary embodiment of the present invention.

Hereinafter, exemplary embodiments of the present invention will be described referring to the drawings. As shown in FIG. 1, a clip 30 according to an exemplary embodiment of the present invention is used for fixing a cover member 20 (as an example of a member to be fixed or a first member) to an upper rail 10 (as an example of a fixed member or a second member) of a vehicle seat which constitutes a driver's seat or the like of a vehicle. The upper rail 10 is provided at both sides of a lower part of the seat along a longitudinal direction of the seat, and assembled to be slidable with respect to a lower rail 90 which is fixed to a floor face F of the vehicle, as shown in FIG. 2, thereby to configure a sliding structure for sliding the seat back and forth. A cushion frame 92 which configures a framework of a seat cushion serving as a seat face of the seat is fixed to the upper rail 10 by means of a lifter mechanism (not shown) which can move up and down. The cover member 20 is fixed to a rear end part of the upper rail 10 and covers a rear side of a gap which is formed below the cushion frame 92 due to an upward movement of the cushion frame 92. It is noted that arrows F and U in the drawings respectively represent frontward direction and upward direction.

Figure 3:
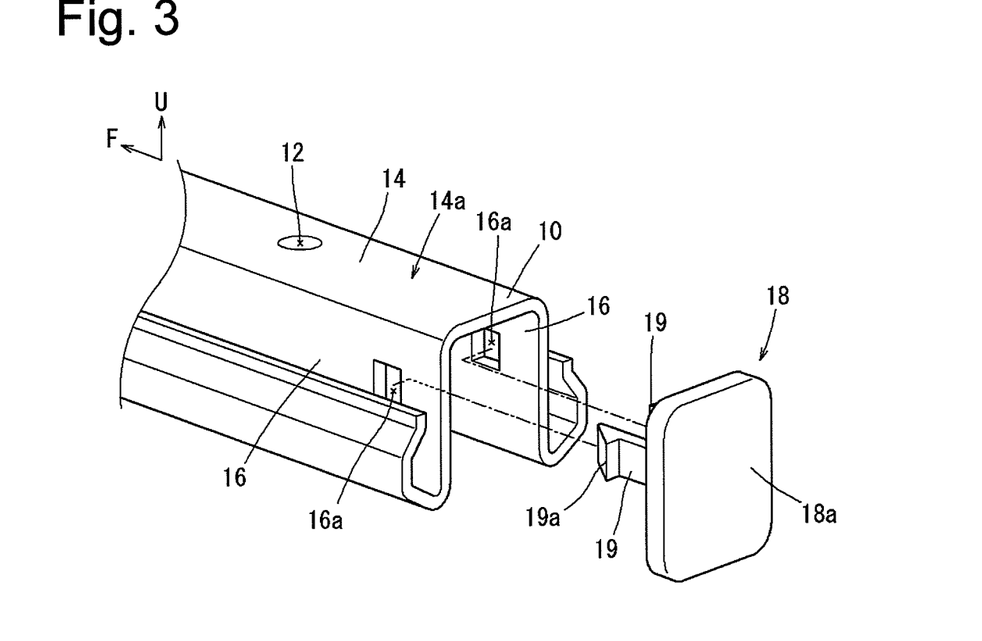
FIG. 3 is an exploded perspective view showing a rear end part of the upper rail according to an exemplary embodiment of the present invention.

As shown in FIG. 3, the upper rail 10 is a long length member having a hat-like shape in section perpendicular to the longitudinal direction. The upper rail 10 includes a roof part 14 which is formed with a through hole 12 in the rear end part. The through hole 12 has a round shape to which a clip 30 is to be attached. The rear end of the upper rail 10 is closed with a cap 18. The cap 18 includes a body part 18a in a substantially square shape having a size which can close the rear end of the upper rail 10, and a pair of flexible leg portions 19 which are provided on a front face of the body part 18a and have locking hooks 19a protruding sideward from tip ends thereof. The cap 18 is inserted into the upper rail 10 from the rear end thereof, while the leg portions 19, 19 are flexed so as to approach to each other against elasticity of the leg portions 19, 19, and pushed in, until the locking hooks 19a formed at respective tip ends of the leg portions 19 are engaged with through holes in a square shape which are formed on both side walls 16, 16 in the rear end part of the upper rail 10. Accordingly, the cap 18 is fitted to the rear end of the upper rail 10.

Figure 9:
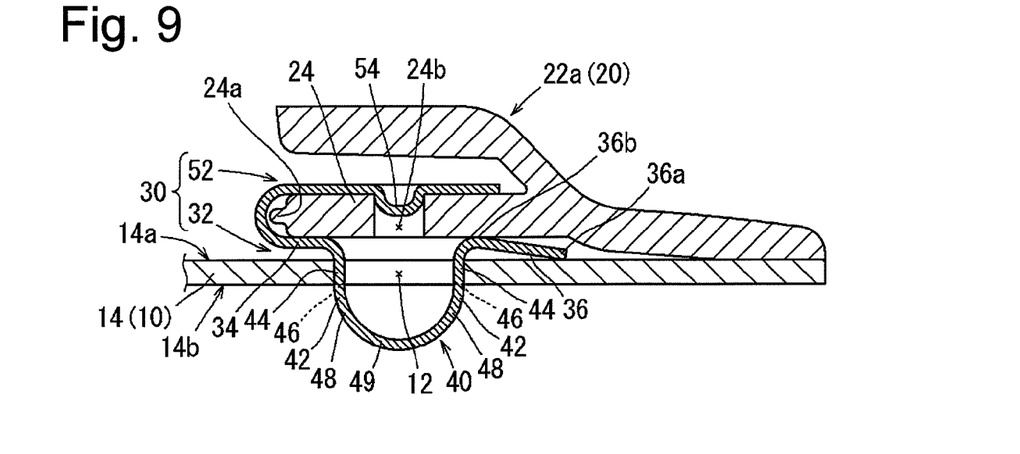
FIG. 9 is a sectional view of the clip as shown in FIG. 8, taken along a line IX-IX.

The cover member 20 is formed of synthetic resin such as polypropylene, for example. As shown in FIGS. 1 and 2, the cover member 20 includes a base part 22 and a cover part 28. The base part 22 includes a base body part 22a to be fixed to the roof part 14 of the upper rail 10 along a surface 14a of the roof part 14 of the upper rail 10, and a side cover part 22b which is provided above the based body part 22a to protrude forward therefrom. It is noted that in the description of this exemplary embodiment, the surface 14a of the roof part 14 of the upper rail 10 refers a face which is exposed outward. A face at an opposite side to the surface 14a is referred to as a back face 14b (See FIG. 9 etc.). The cover part 28 of the cover member 20 includes a cover body 28a and a hook 29 which are connected to each other by way of a bent portion 29a. The cover body 28a is a plate-like member capable of covering a rear lower part of the cushion frame 92 and is rotatably connected to the base body 22a at a base end 28b at an opposite side to a tip end where the hook 29 is formed. As shown in FIG. 2, the hook 29 is hooked on a rod 94 which is suspended in a lateral direction in the rear part of the cushion frame 92, and is configured such that when the cushion frame 92 moves upward, the cover body 28a is erected to cover the rear lower part of the cushion frame 92, and when the cushion frame 92 moves downward, the cover part 28 is bent and the cover body 28a is tilted to cover the rear lower part of the cushion frame 92. Accordingly, the rear lower part of the cushion frame 92 can be covered with the cover member 20 irrespective of upward movement and downward movement of the cushion frame 92. In FIG. 2, the cushion frame 92 is shown in an upwardly moved state. As shown in FIG. 9, the base body 22a of the cover member 20 includes a region 24 to be fixed having a flat plate shape which is substantially horizontally formed. The clip 30 is attached to this flat plate region 24 to be fixed, and this region 24 is fixed to the upper rail 10 by means of the clip 30.

Figure 4:
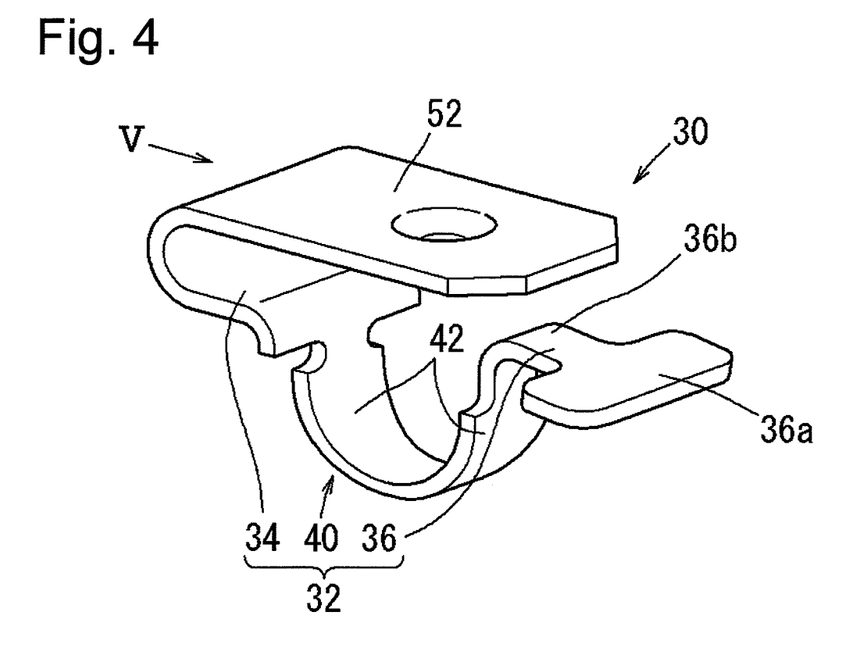
FIG. 4 is a perspective view of a clip according to an exemplary embodiment of the present invention.

The clip 30 includes a first clamping piece 32 and a second clamping piece 52 which are provided so as to clamp the flat plate region 24 of the cover member 20 from both faces thereof. That is, the first clamping piece 32 opposes a first face of the flat plate region 24, and the second clamping piece 52 opposes a second face of the flat plate region 24, which is opposite to the first face. The first clamping piece 32 and the second clamping piece 52 are integrally connected to each other to have U-shape at base ends thereof. As shown in FIG. 4, the clip 30 is formed of steel material by bending work, that is, the first clamping piece 32 and the second clamping piece 52 are formed by folding the steel material having a plate shape into a U-shape The first clamping piece 32 includes an insertion part 40 and first and second rib parts 34, 36 which are formed by bending work. The insertion part 40 is formed into an omega (Ω) shape protruding in a direction separating from the second clamping piece 52 and is configured to be inserted into a through hole 12 of the upper rail 10 (See FIG. 9). Specifically, the insertion part 40 includes a pair of strip members 42, 42 connected to each other at tip ends thereof in an inserting direction to have the omega (Ω) shape. The first and second rib parts 34, 36 extend from respective base ends of the strip members 42, 42.

Figure 7:
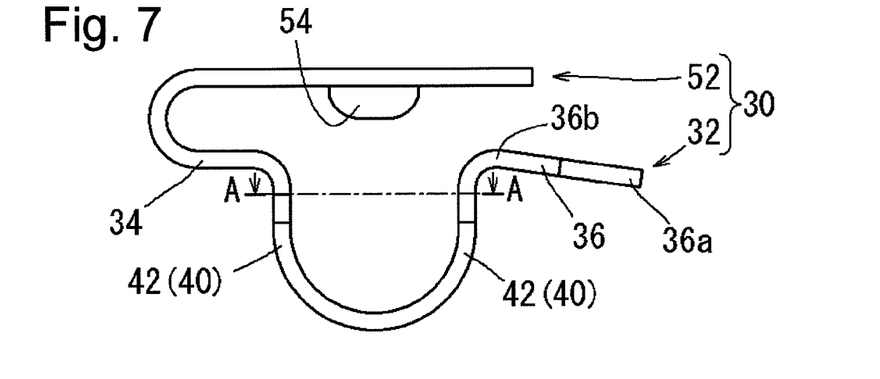
FIG. 7 is a side view of the clip as shown in FIG. 4.

The first and second rib parts 34, 36 protrude outward of the through hole 12 in directions opposite to each other from the insertion part 40 so as not to be insertable into the through hole 12. As shown in FIG. 4, the first rib part 34 which is continued to the second clamping piece 52 is formed substantially in parallel with the second clamping piece 52 and has the same width as the second clamping piece 52. The insertion part 40 is smaller in width than the first rib part 34. The second rib part 36 which is formed at an opposite side to the first rib part 34 with respect to the insertion part 40 has the same width as the insertion part 40 which is relatively smaller in width, specifically, for example, smaller than the first rib part 34 or the second clamping pieces 52. A tip end 36a of the second rib part 36 is formed into a T-shape in a plan view. Further, the second rib 36 extends further than the second clamping piece 52 from a part where the first clamping piece 32 and the second clamping piece 52 are connected. As shown in FIG. 7, the second rib part 36 is inclined in a direction separating from the second clamping piece 52 toward the tip end 36a so that a gap between the second rib part 36 and the second clamping piece 52 becomes large. As shown in FIG. 9 etc., the clip 30 is configured to clamp the region 24 of the cover member 20 between the first rib part 34 and the base portion 36b of the second rib part 36 configuring the first clamping piece 32, and the second clamping piece 52. The region 24 of the cover member 20 is formed as an open end at a front end 24a, and the clip 30 is attached to the cover member 20, by inserting the region 24 between the first clamping piece 32 and the second clamping piece 52 from the open front end 24a. Since the tip end 36a of the second rib part 36 of the clip 30 is inclined in a direction separating from the second clamping piece 52, and the front end 24a of the region 24 has a thin wall thickness, the region 24 can be easily inserted between the first clamping piece 32 and the second clamping piece 52. The second clamping piece 52 is formed with a projected part 54 which projects from a face opposing the region 24. By engaging this projected part 54 with a recessed part 24b which is formed to pass through the region 24, the clip 30 is positioned with respect to the region 24 of the cover member 20.

Figure 5:
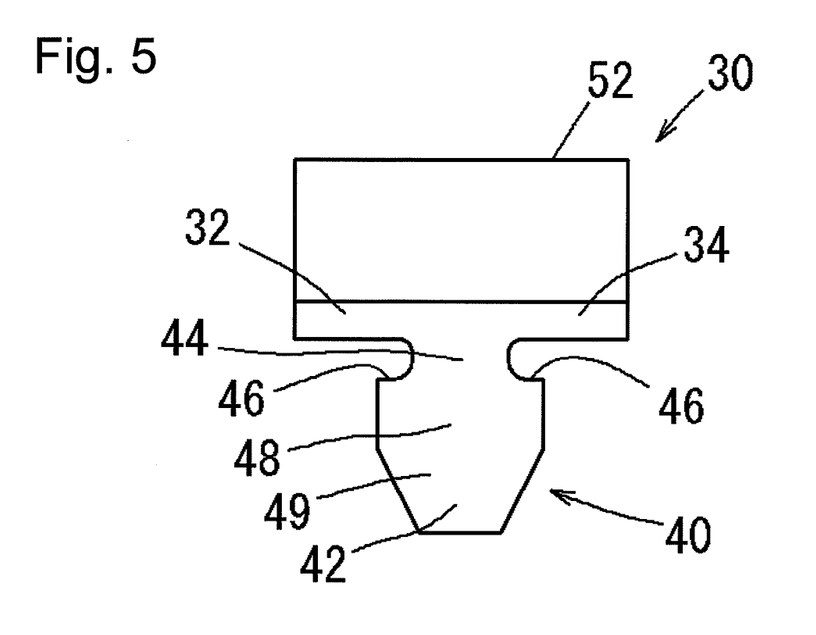
FIG. 5 is a view of the clip as shown in FIG. 4, as seen from a direction of an arrow V.
Figure 6:
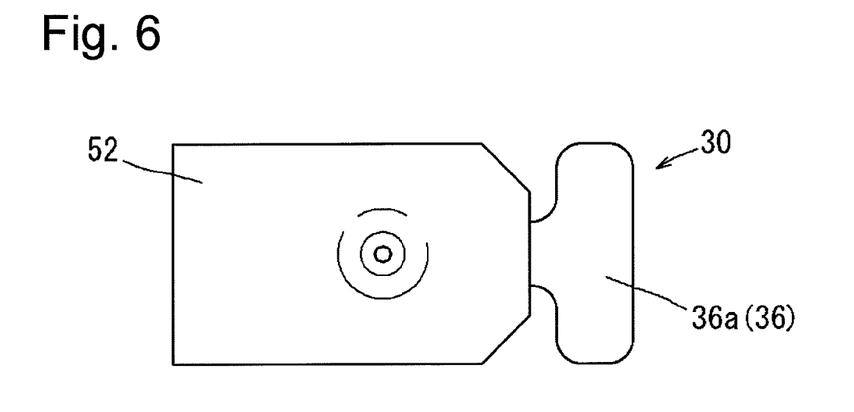
FIG. 6 is a plan view of the clip as shown in FIG. 4.
Figure 8:
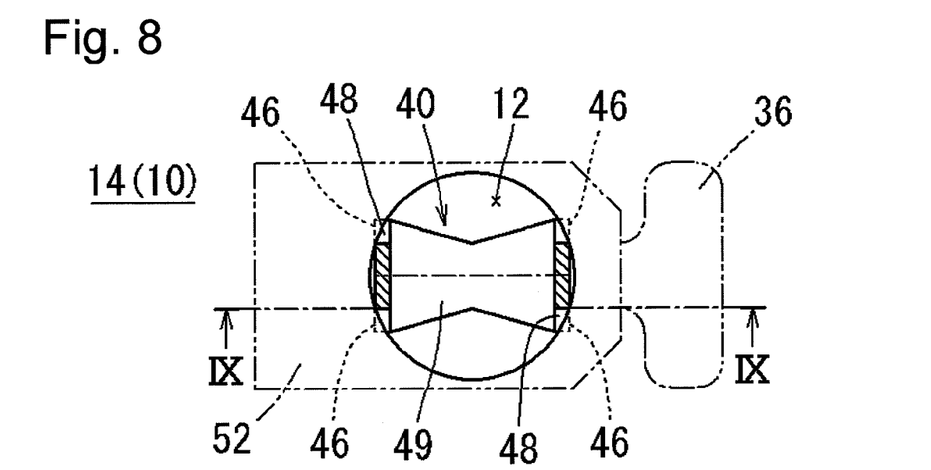
FIG. 8 is a sectional view of the clip as shown in FIG. 7 in the state attached to the upper rail, taken along a line A-A.
Figure 10:
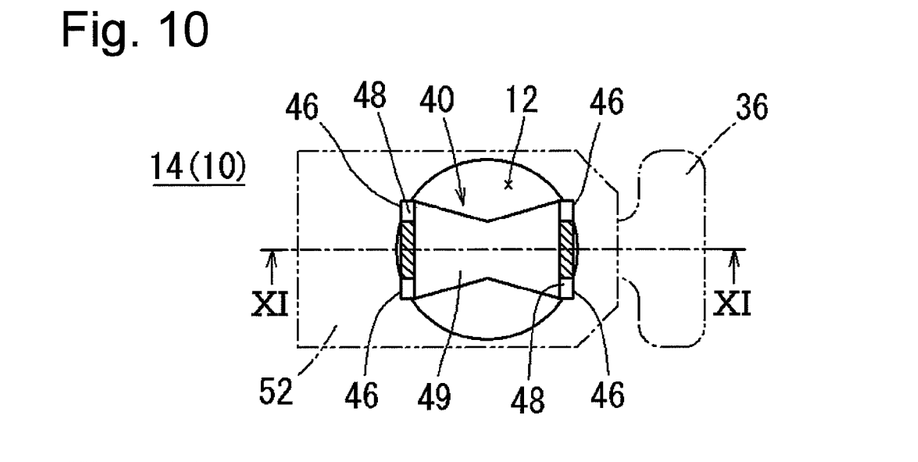
FIG. 10 is a view showing a process of attaching the clip to the upper rail according to an exemplary embodiment of the present invention, wherein enlarged width portions of the clip have been inserted into a through hole in the upper rail.
Figure 11:
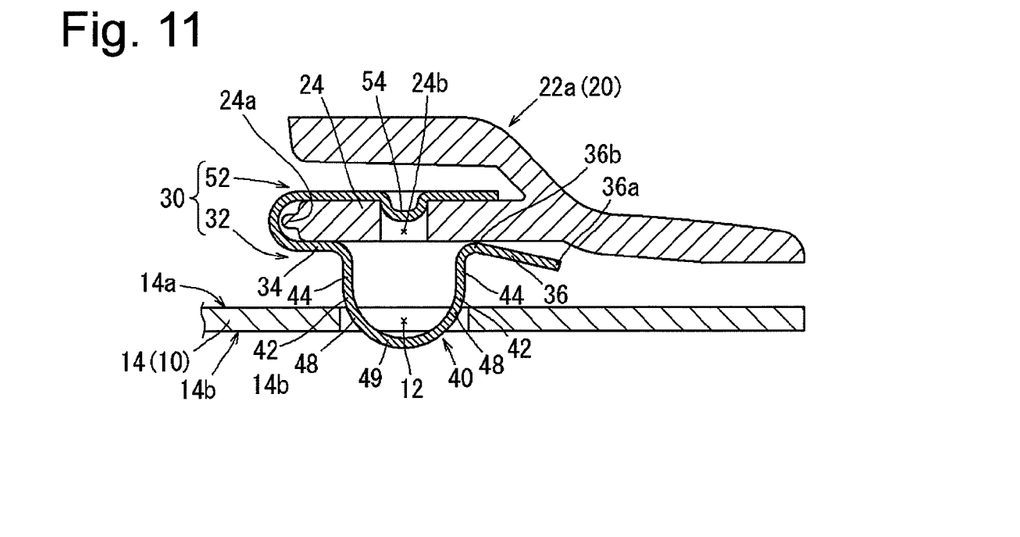
FIG. 11 is a sectional view of the clip as shown in FIG. 10, taken along a line XI-XI.
Figure 12:
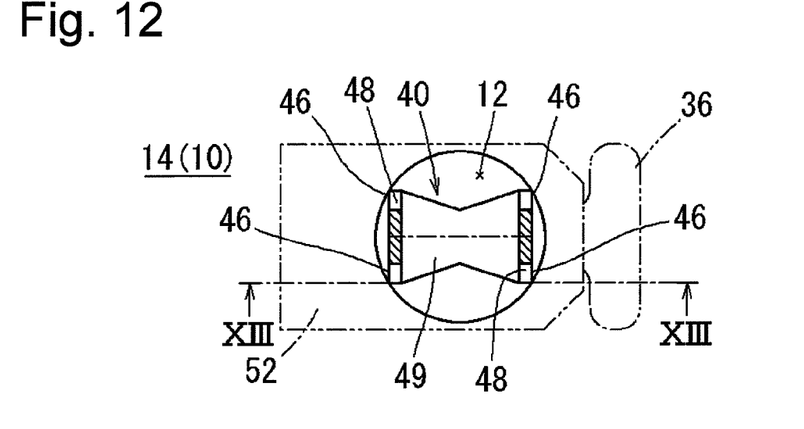
FIG. 12 is a view showing the process for attaching the clip to the upper rail according to an exemplary embodiment of the present invention, wherein larger width portions of the clip have been inserted into the through hole in the upper rail.
Figure 13:
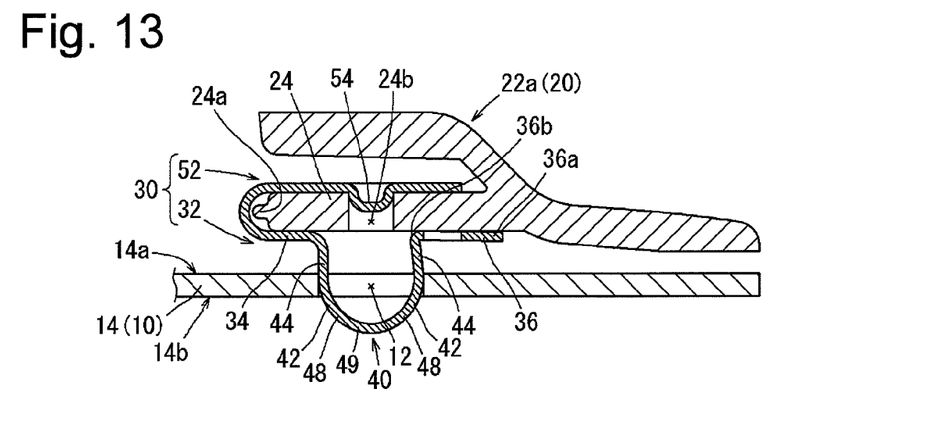
FIG. 13 is a sectional view of the clip as shown in FIG. 12, taken along a line XIII-XIII.

As shown in FIG. 5, the insertion part 40 includes, in order from respective tip end sides of the strip members 42, 42, enlarged width portions 49 which are gradually enlarged in width toward the base ends of the strip members 42, 42, larger width portions 48 which have a relatively larger width, and smaller width portions 44 which have a relatively smaller width formed by cutting out the larger width portions 48 from both sides thereof. There are formed stepped portions 46 between the larger width portions 48 and the smaller width portions 44. The clip 30 is configured such that after the insertion part 40 has been inserted into the through hole 12 in the upper rail 10 formed of rigid material which is not deformed, the larger width portions 48 pass the through hole 12, while the pair of strip members 42, 42 are flexed so as to approach to each other. In other words, the through hole 12 is formed into a round shape having such a size that the larger width portions 48 of the insertion part 40 are not allowed to enter in the through hole 12 in an original state, but allowed to enter when the pair of strip members 42, 42 are flexed to approach to each other. As shown in FIGS. 10 and 11, when the insertion part 40 is inserted into the through hole 12 from the surface 14a of the upper rail 10, both sides of base ends of the enlarged width portions 49 come into contact with an edge of the through hole 12. By further pushing the insertion part 40 into the through hole 12 against the contact, the pair of strip members 42, 42 are gradually flexed so as to approach to each other, whereby the larger width portions 48 continued from the enlarged width portions 49 are allowed to pass the through hole 12, as shown in FIGS. 12 and 13. Then, as shown in FIGS. 8 and 9, when the smaller width portions 44 which have the relatively smaller width have been inserted into the through hole 12, the strip members 42, 42 are allowed to be deformed and separated from each other to return to the original state. This is because the smaller width portions 44 can pass a part of the through hole 12 which has a relatively smaller width as seen in a lateral direction of the strip members 42. In a state where the smaller width portions 44 have come into contact with the edge of the through hole 12, the pair of strip members 42, 42 are separated from each other thereby to restrain the insertion part 40 from being deformed so as to return to the original state. In this state, the stepped portions 46 formed between the larger width portions 48 and the smaller width portions 44 protrude sideward from the through hole 12 along the back face 14b of the roof part 14 of the upper rail 10. Since the four stepped portions 46 in total which are formed in the insertion part 40 are engaged with the back face 14b of the roof part 14 of the upper rail 10, the insertion part 40 is restrained from moving in a releasing direction, and the insertion part 40 becomes a retained state. Accordingly, the clip 30 is fixed to the upper rail 10.

In order to fix the cover member 20 to the upper rail 10, it is advantageous that the clip 30 is attached to the region 24 of the cover member 20, as a first step, and then, the clip 30 is attached to the upper rail 10. In this course, when the insertion part 40 is flexed and the strip members 42, 42 approach to each other at inserting the insertion part 40 into the through hole 12, as shown in FIG. 13, the second rib part 36 which is inclined toward the tip end 36a in a direction separating from the second clamping piece 52 such that the gap between the second rib part 36 and the second clamping piece 52 becomes large is rotated around the base part 36b, while sliding along the region 24. Accordingly, deformation of the strip members 42, 42 to approach to each other can be facilitated.

According to above-described clip 30, the following operation and effects can be attained.

Firstly, the clip 30 can be easily attached to the cover member 20 (as an example of the member to be fixed), by clamping the region 24 to be fixed between the first clamping piece 32 and the second clamping piece 52 with simple structure. Moreover, the clip 30 can be easily and reliably positioned with respect to the region 24 to be fixed, since the projected part 54 formed in the second clamping piece 52 is engaged with the recessed part 24b of the region 24 to be fixed.

Secondly, the clip 30 can be attached to the upper rail 10 (as an example of a fixed member), only by forming the simple through hole 12 in the upper rail 10. Moreover, the clip 30 can be easily and reliably attached to the upper rail 10, by simple operation of pushing the insertion part 40 of the clip 30 into the through hole 12. Therefore, it is possible to easily and reliably attach the cover member 20 to the upper rail 10, even in a narrow attaching space such as a space between the upper rail 10 and the cushion frame 92.

While the present invention has been shown and described with reference to certain exemplary embodiments thereof, it will be understood by those skilled in the art that various changes in form and details may be made therein without departing from the spirit and scope of the invention as defined by the appended claims.

Figure 14:
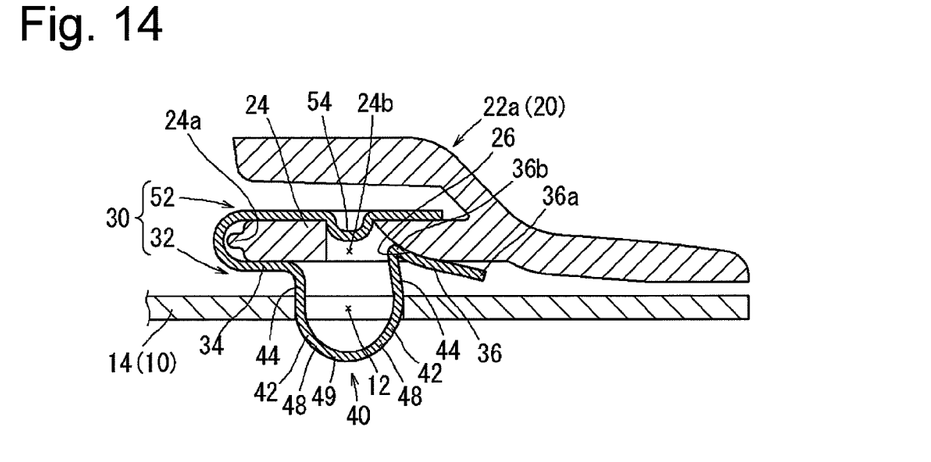
FIG. 14 is a view showing a process for attaching the clip to the upper rail according to a modified exemplary embodiment of the present invention and corresponding to the sectional view as shown in FIG. 10.
Figure 15:
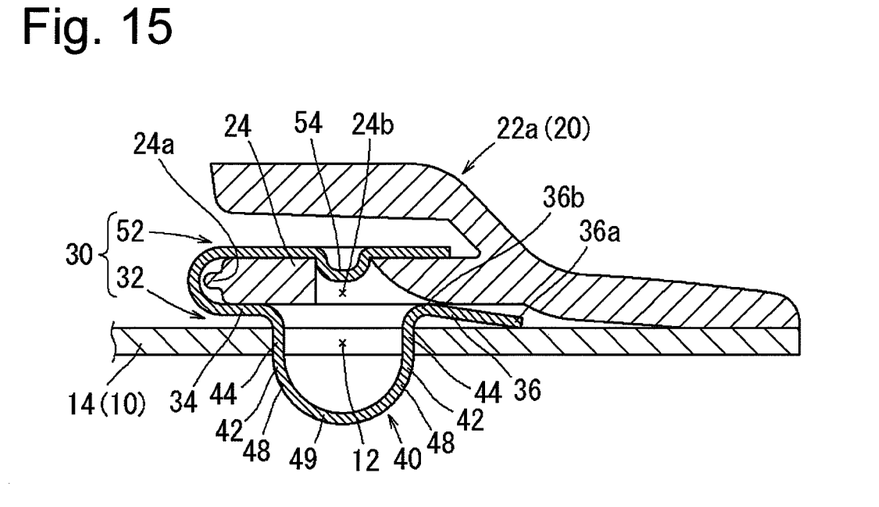
FIG. 15 is a view showing a state where the clip has been attached to the upper rail according to the modified exemplary embodiment of the present invention as shown in FIG. 14.

For example, as shown in FIGS. 14 and 15, it is advantageous to form a guide slope 26 in the region 24 of the cover member 20 at a position opposing the second rib part 36 of the first clamping piece 32. The guide slope 26 is a slanted face which is inclined so as to open toward a position opposing the insertion part 40, and formed as a curved slanted face, for example. According to the guide slope 26 as described above, at inserting the insertion part 40 of the clip 30 into the through hole 12, when the insertion part 40 is flexed and the strip members 42, 42 approach to each other, the second rib part 36 is guided by the guide slope 26 and easily displaced toward the insertion part 40, as shown in FIG. 14. Accordingly, the deformation of the pair of strip members 42, 42 to approach to each other can be facilitated, and the clip 30 can be more easily attached to the upper rail 10.

Further, the shape of the through hole 12 formed in the fixed member is not limited to a round shape, but may be an oblong shape or a rhombic shape, provided that the width corresponding to the lateral direction of the strip members 42 is enlarged in a direction where the strip members 42, 42 approach to each other.

Further, material for the clip 30 is not particularly limited, but the clip 30 may be formed of synthetic resin or the like.

Further, the clip 30 is not limited to a case where the cover member 20 is fixed to the upper rail 10, but can be widely used in other structures in case of fixing the member to be fixed to the fixed member.

What is claimed is:

1. An attaching structure comprising:
    a first member having a flat plate region;
    a second member having a through hole; and
    a clip which is attached to the first member and the second member to fix the first member with respect to the second member,
    wherein the clip includes:
        a first clamping piece opposing a first face of the flat plate region of the first member;
        a second clamping piece opposing a second face of the flat plate region of the first member, the second face being opposite to the first face; and
        a connecting portion connecting the first and second clamping pieces,
    wherein the first clamping piece includes:
        a first rib part which is connected to the connecting portion and provided substantially parallel to the second clamping piece;
        an insertion part which protrudes in a direction separating from the second clamping piece and which includes a first strip member connected to the first rib part, and a second strip member connected to the first strip member at a protruding end; and
        a second rib part which is connected to the second strip member,
    wherein each of the first and second strip members includes a smaller width portion, and a larger width portion provided at a protruding end side from the smaller width portion, the larger width portion being wider than the smaller width portion,
    wherein the insertion part is inserted into the through hole of the second member such that the smaller width portion contacts the through hole,
    wherein the second rib part provided at an opposite side to the first rib part, which is continued to the second clamping piece with respect to the insertion part, is inclined to open toward a tip end thereof,
    wherein the first member includes a guide slope,
    wherein the flat plate region of the first member is clamped between the first and second clamping pieces, so that the clip is attached to the first member, and the insertion part is inserted into the through hole of the second member such that the second rib part, which is inclined to open toward the tip end, contacts the guide slope, and
    wherein the guide slope has a curved slanted face which is open toward a position opposing the insertion part.

2. The attaching structure according to claim 1, wherein the flat plate region of the first member has a recessed part, the second clamping piece includes a projected part engaged with the recessed part of the first member so as to position the clip with respect to the first member, and the recessed part has the guide slope.

* * * * *